United States Patent [19]
Holyoak

[11] Patent Number: 5,306,201
[45] Date of Patent: Apr. 26, 1994

[54] FISH SCALER AND METHOD THEREOF

[76] Inventor: H. K. Holyoak, P.O. Box 449, Alapala, Ga. 31622

[21] Appl. No.: 956,648

[22] Filed: Oct. 2, 1992

[51] Int. Cl.[5] .............................. A22C 25/02
[52] U.S. Cl. ............................... 452/99; 452/98
[58] Field of Search ............... 452/98, 86, 99, 101, 452/105

[56] References Cited

U.S. PATENT DOCUMENTS

| | | | |
|---|---|---|---|
| 3,304,574 | 2/1967 | Ham et al. | 452/99 |
| 3,766,605 | 10/1973 | Burns | 452/99 |
| 4,485,526 | 12/1984 | Opanasenko | 452/99 |
| 4,875,255 | 10/1989 | Kent, Jr. | 452/99 |
| 4,945,608 | 8/1990 | Majure et al. | 452/99 |

*Primary Examiner*—Willis Little
*Attorney, Agent, or Firm*—Hopkins & Thomas

[57] ABSTRACT

A fish scaler (10) includes a cylindrical fish scaling barrel (11) having a cylindrical grate wall (19) and two conically shaped end walls (20a, 20b). A flipper protrusion (63) extends inwardly from the cylindrical grate wall for catching the fish and flipping them as the barrel rotates. The drive means (12) for rotating the barrel comprises a drive wheel (27) biased against the cylindrical grate wall and a motor for rotating the drive wheel.

24 Claims, 6 Drawing Sheets

FISH SCALER AND METHOD THEREOF

FIELD OF THE INVENTION

The present invention generally relates to fish scalers and, more particularly, to an automated fish scaler and method for efficiently scaling large quantities of fish.

BACKGROUND OF THE INVENTION

There are many electric fish scalers known in the art employable for scaling large quantities of fish. A typical electric fish scaler comprises a large cylindrical barrel into which a large quantity of fish is placed for scaling. The cylindrical barrel has a diamond-shaped mesh wall or grate with sharp edges to scrape the sides of the fish and a means for rotating the cylindrical barrel about its axis to cause the sharp edges of the barrel's grate to scrape the sides of the fish. Since it is desirable to rinse the fish as the fish are scaled in order to keep the fish moist and to clean the skin of the fish, such prior art fish scalers typically include a rinse system for directing high powered jets of water into the barrel as the barrel rotates to rinse the scales from the barrel and to clean the fish as the fish are scaled.

A significant disadvantage of employing a large cylindrical barrel with a large grate surface area to scale fish is that the sharp edges of the grate do not always sufficiently scale the fish. The problem arises due to the insufficient force of the fish against the grate as the cylindrical barrel is rotated. The rotation rate of the barrel is limited in order to prevent the fish from clinging to the wall of the barrel and thus not sliding along the grate surface. However, a limited rotation rate reduces the force of the fish against the scaling edges of the grate. To increase the weight of fish acting against the grate of a large cylindrical barrel having a large grate surface area, the entire barrel needs to be filled with fish, thus allowing the fish to pile up on top of one another and weight each other down against the sharp edges of the grate. When less than a full quantity of fish are to be scaled, the fish tend to spread out in the barrel, rather than pile up on top of each other, thereby reducing the force of the fish against the grate surface and resulting in incomplete scaling.

Another disadvantage with such prior art fish scalers is that they tend to scale only one side of the fish. This is so because the limited rotation rate of the barrel inhibits the tumbling of the fish within the rotating cylindrical barrel. Only when the barrel is fully loaded with fish will complete tumbling of the fish be achieved. Thus, when less than a full quantity of fish is scaled, either the fish are not sufficiently scaled on all sides or the fish scaler must be run for longer periods of time in order to allow for complete scaling of the fish.

In addition, many fish scalers are driven with a conventional chain and sprocket drive system. However, such sprocket drive systems often require constant maintenance, which undesirably adds to the operational costs of these types of machines.

Accordingly, a heretofore unaddressed need exists in the industry for a fish scaler with a simple drive means that can achieve increased tumbling action of the fish and can better concentrate the fish within the scaling barrel to increase the scaling force of the fish against the grate.

SUMMARY OF THE INVENTION

Briefly described, the present invention comprises an electric fish scaler for scaling and cleaning large quantities of fish. In the novel fish scaler, a cylindrical barrel chamber has a narrow profile and tapered, or conically-shaped end walls in order to concentrate the fish at the center of the barrel to enhance the scaling action of the grate wall on the fish. The cylindrical barrel is mounted vertically about a horizontally-oriented axial shaft that is mounted on to a work bench. The narrow profile of the barrel is created by the barrel having a diameter that is substantially greater than its width. The conically-shaped end walls protrude outwardly from the barrel in order to increase the volume of the barrel without increasing the surface area of the grate wall.

The conical shape of the end walls tends to urge the fish toward the center of the barrel as the fish are scaled within the rotating barrel, thus causing the fish to concentrate at the center of the barrel along the grate wall. This arrangement causes the fish to pile up on top of one another within the narrow confines of the barrel as it is rotated, thus increasing the weight of the fish against the sharp edges of the grate wall. With a greater force pressing the fish against the grate wall, the sharp edges of the grate wall do a better job of scraping the scales from the fish than in prior art embodiments.

A fish flipping member is provided within the cylindrical barrel that extends inwardly from the grate wall of the barrel. The flipper member catches the fish as the barrel is rotated and flips them, thereby causing the fish to tumble so that all sides of the fish have an opportunity to engage the grate wall as the barrel is rotated.

The drive means for rotating the barrel comprises a geared motor coupled to a drive wheel that engages the exterior surface of the grate wall. The drive wheel is mounted onto a drive shaft that is parallel to the axis of the barrel so that rotation of the drive wheel is directly imparted to the barrel. The drive wheel has a tread-like surface for engaging the criss-crossed lattice structure of the grate wall in order to increase the traction therebetween. The drive motor is mounted onto a board that pivotally rotates. A biasing means, such as a spring or a threaded eye screw, biases the drive motor, and thus the drive wheel, against the exterior surface of the grate wall. Such a drive means eliminates the chain and sprocket arrangement of the prior art, thus reducing maintenance costs.

The cylindrical barrel and the drive means are mounted atop a work bench. The work bench provides a work surface adjacent the barrel to assist in loading and unloading the fish. A high powered rinse system directs jets of water inwardly from the axial shaft supporting the barrel into the interior of the barrel to rinse the scales therefrom.

Accordingly, an object of the present invention is to provide a fish scaler and method for efficiently scaling fish.

Another object of the present invention is to provide a fish scaler for scaling fish that is simple in design, efficient in operation, and durable in structure.

Another object of the present invention is to provide a fish scaler for scaling fish that concentrates the fish within the barrel of the fish scaler in order to cause the fish to pile up on top of each other in order to increase the weight of the fish against the scaling surface.

Another object of the present invention is to provide a fish scaler that causes the fish within the barrel to tumble as the barrel is rotated, particularly when the barrel is not completely loaded with fish.

Another object of the present invention is to provide a fish scaler that has a narrow profile yet a volume sufficient to scale large quantities of fish.

Another object of the present invention is to provide a fish scaler that has an electric drive mechanism that requires low maintenance.

Another object of the present invention is to provide a fish scaler that has a drive mechanism including a drive wheel that is biased against the exterior surface of the grate wall of the barrel of the apparatus.

Another object of the present invention is to provide a fish scaler that is easily mounted to a work bench in order to incorporate a working surface next to the barrel.

Another object of the present invention is to provide a fish scaler that efficiently and quickly scales large quantities of fish and that includes a high power rinse system for cleaning the fish as they are scaled.

Other objects, features, and advantages of the present invention will become apparent from the following description, when read in conjunction with the accompanying drawings.

BRIEF DESCRIPTION OF THE DRAWINGS

The present invention, as defined in the claims, can be better understood with reference to the following drawings. The drawings are not necessarily to scale, emphasis instead being placed upon clearly illustrating principles of the present invention.

DETAILED DESCRIPTION OF THE PREFERRED EMBODIMENT

Figure 1:
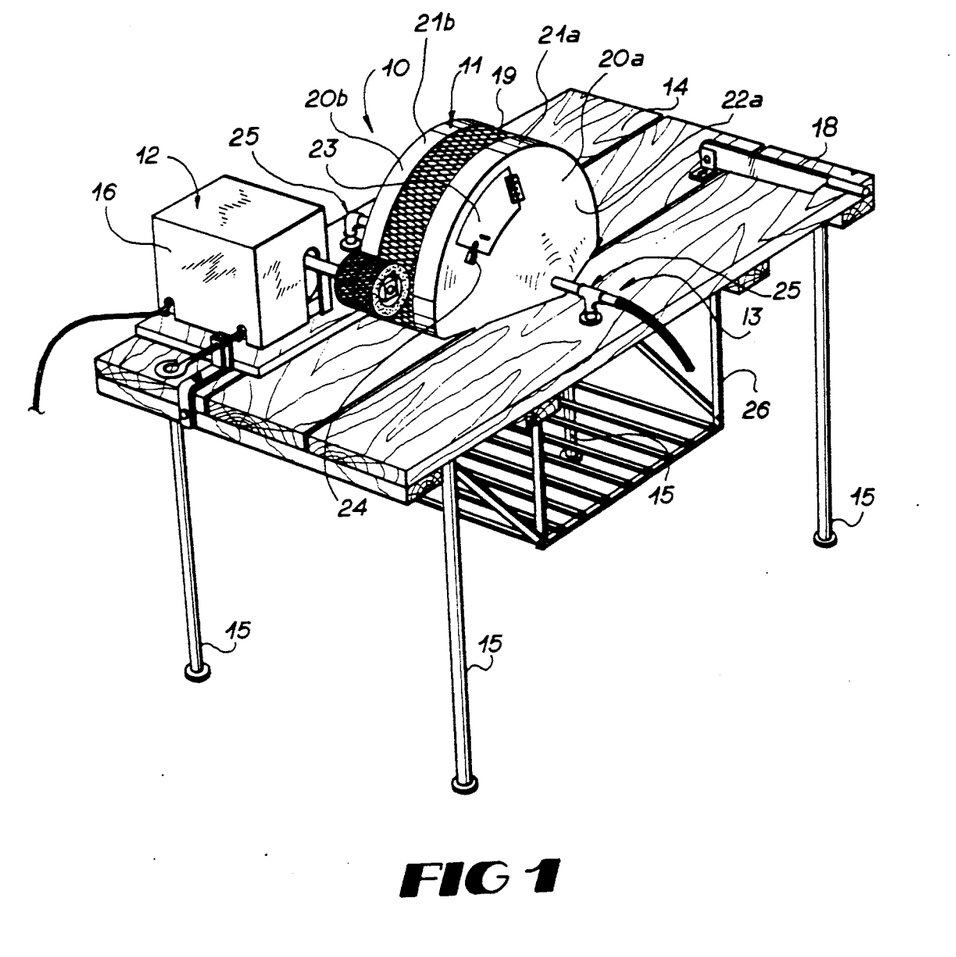
FIG. 1 is a perspective view of the fish scaler constructed in accordance with a preferred embodiment of the present invention.
Figure 2:
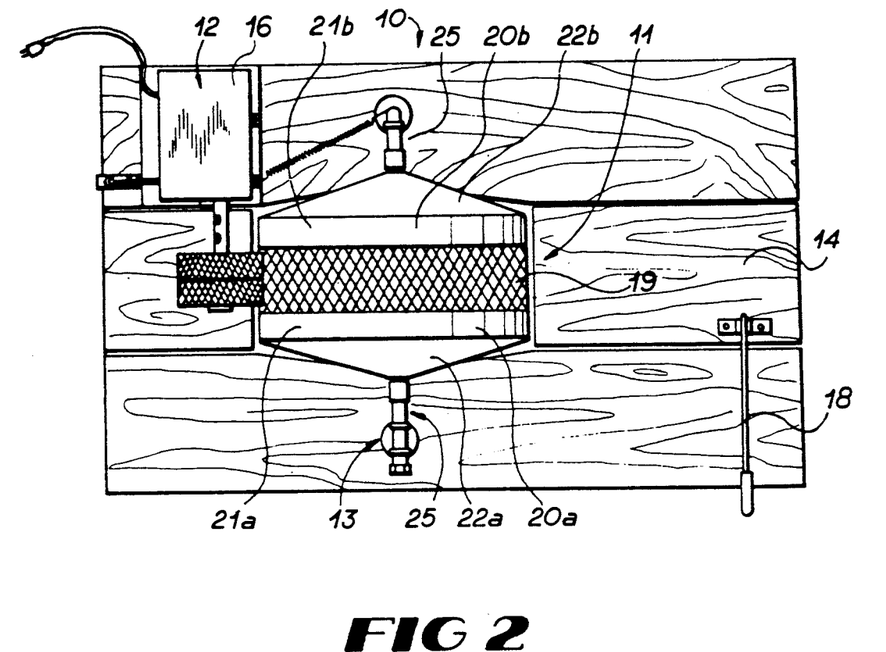
FIG. 2 is a top plan view of the fish scaler of FIG. 1.

Referring now in more detail to the drawings, in which like numerals represent like parts throughout the several views, FIGS. 1 and 2 are a perspective view and a top plan view, respectively, of the fish scaler 10 constructed in accordance with a preferred embodiment of the present invention. The fish scaler 10 comprises generally a fish scaling cylindrical barrel 11, a drive means 12, and a rinse system 13. A work bench 14 supports the fish scaling barrel 11, drive means 12, and rinse system 13. The work bench 14 is supported by four legs 15, shown in FIG. 1. The drive means 12 can be partially enclosed, as shown, within a drive means cover box 16.

While a work bench 14 supported by four legs 15 is depicted in the drawings, alternative arrangements known in the art are feasible for supporting the fish scaling barrel 11, the drive means 12, and the rinse system 13. The work bench 14 simply provides a surface upon which objects, tools, and other items can be placed while the fish scaler 10 is being used. Also shown in FIGS. 1 and 2 is a mounted filet knife 18, which can be used to cut the fish either before or after they are placed into the fish scaling barrel 11.

The fish scaling barrel 11 comprises a cylindrical grate wall 19 and two end wall pieces 20a and 20b that close off the cylindrical grate wall 19 to form an enclosed fish scaling chamber. The two end walls 20a and 20b include an annular collar member 21a and 21b and a conically shaped cap 22a and 22b that extend outwardly from the cylindrical grate wall 19. The cap 22a of end wall 20a includes a hinged door 23 including a latch 24, which provides access to the interior of the fish scaling chamber 11 for loading and unloading of the fish. An axial mounting arrangement 25 rotatably supports the cylindrical barrel 11 atop the work bench 14.

A bracketed shelf 26, as shown in FIG. 1, is mounted beneath the work bench 14. The purpose of the bracketed shelf 26 is to provide a shelf for supporting a pan or bucket to catch the scales as they are rinsed from the fish scaling chamber, if desired. Alternatively, a pan or bucket can be positioned on the bracketed shelf 26 for removal of the fish, from the barrel after the fish have been scaled. For this, the barrel simply needs to be rotated until the door 23 is below the work bench 14, whereupon the door 23 can be opened and the fish pulled from the barrel 11 and placed in the pan or bucket.

Figure 3:
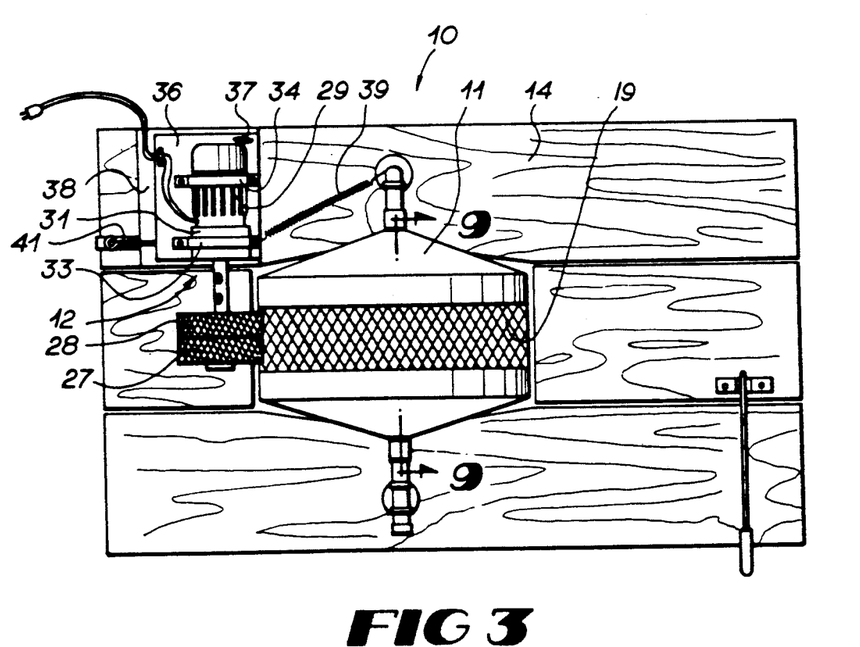
FIG. 3 is a top plan view of the fish scaler of FIG. 2 with a cover box for the drive motor removed.
Figure 4:
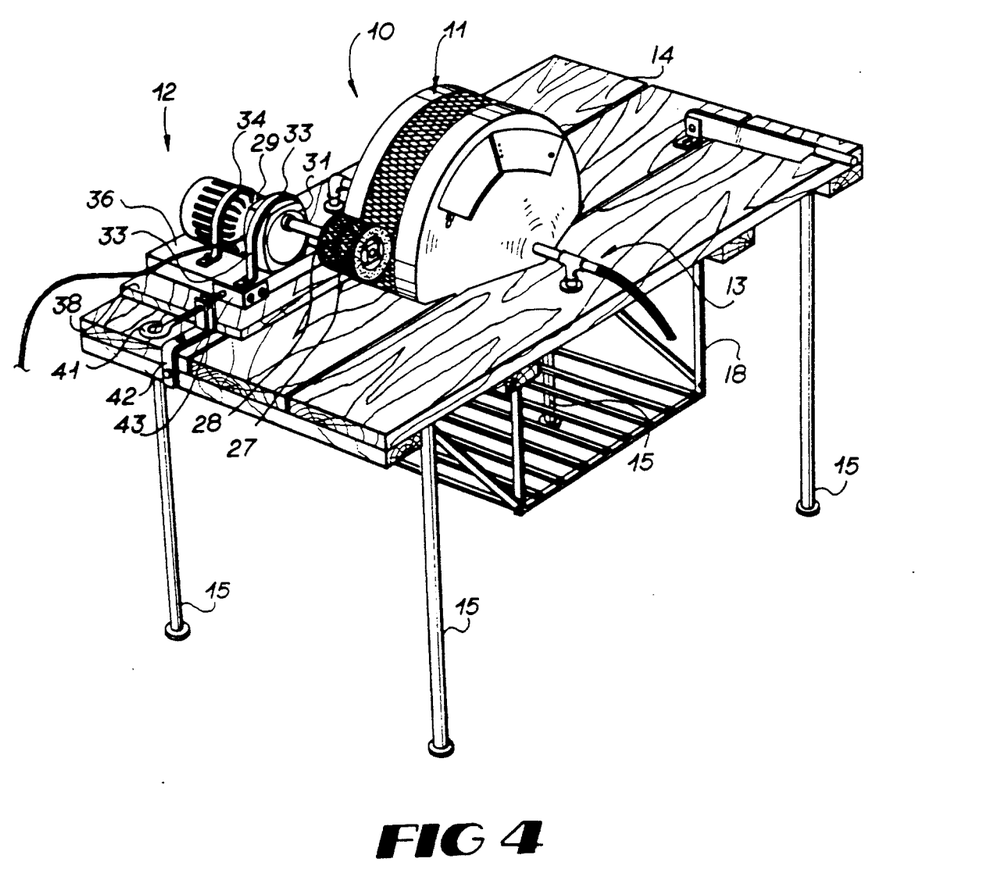
FIG. 4 is a perspective view of the fish scaler of FIG. 1 with the cover box for the drive motor removed.

FIGS. 3 and 4 are a top plan view and a perspective view, respectively, of the fish scaler 10 shown in FIGS. 1 and 2 with the drive means cover box 16 removed illustrating the drive mechanism of the fish scaler 10. The drive means 12 includes a drive wheel 27 that has a treaded surface 28 which directly engages the grate wall 19 of the fish scaling barrel 11.

The drive wheel 27 is coupled to a drive motor 29 via a gear box 31. A pair of U-shaped clamps 33, 34 secure the drive motor 29 to a movable, rectangular support board 36. A pivot bolt hinge 37 pivotally secures the support board 36 to a stationary board 38, which is mounted atop the work bench 14. As further illustrated in FIG. 3, a coil tension spring 39 is mounted between the support board 36 and the barrel mounting arrangement 25. The coil tension spring 39 biases the support board 36 and the drive motor 29 so that the drive wheel 27 continuously engages the grate wall 19 of the fish scaling barrel 11. In addition, a threaded eye bolt 41 also biases the support board 36, the drive motor 29, and the drive wheel 27 into engagement with the grate wall 19 of the fish scaling barrel 11. The threaded eye bolt 41 threads into a bracket 42, which is secured to the work bench 14. The threaded eye bolt 41 is adapted to bear against an L-shaped bracket 43, shown in FIG. 4, which is mounted about a corner of the support board 36. Even though the spring 39 and the bolt 41 are shown for purposes of biasing the drive wheel 27 against the grate wall 19, either the spring 39 or the bolt 41 in and of itself is sufficient to perform the described biasing function. Accordingly, it can be seen that the spring 39 and the threaded eye bolt 41, individually or collectively, function as a means for biasing the drive wheel against the grate wall.

Figures 5, 6:
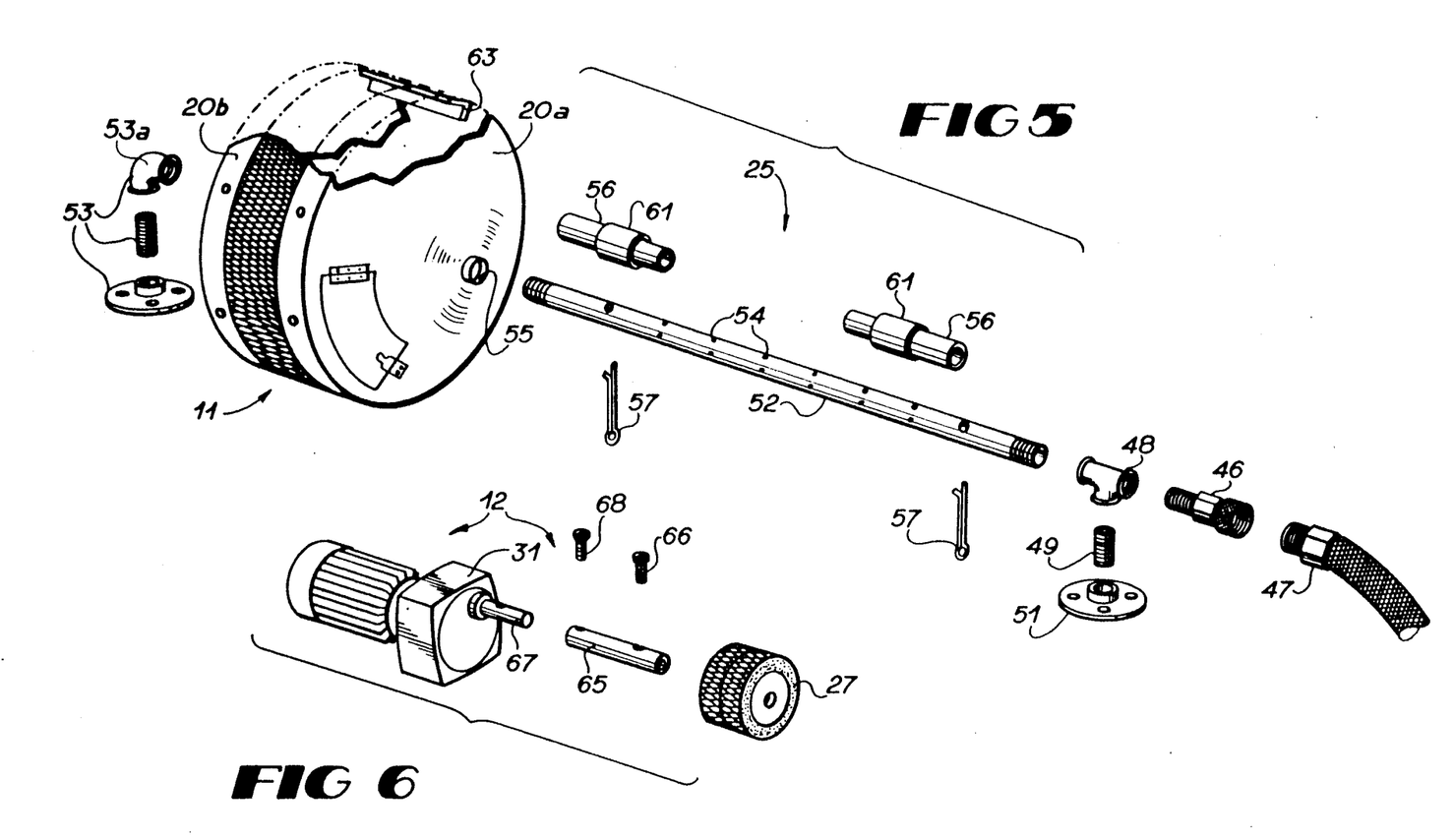
FIG. 5 is an exploded assembly view of the cylindrical barrel mounting arrangement and the rinse system of the fish scaler of FIG. 1, with the cylindrical barrel shown partially cut-away to reveal the flipper protrusion member.
FIG. 6 is an exploded assembly view of the drive means of the fish scaler of FIG. 1.

FIG. 5 is an exploded assembly view of the mounting arrangement 25 for the fish scaling barrel 11 and the rinse system 13. A conventional hose coupling 46 is provided to receive the male connection of a conventional garden hose 47 or some other suitable water supply means. The hose coupling 46 is secured to a T-junction piece 48, which is supported by a mounting stud 49 securable to a base plate 51 that is secured to the work bench 14. An elongated water channel pipe 52 is secured at one end to T-junction 48 and at the other end to a mounting assembly 53, which is similar to pieces 48, 49, and 51 and is secured to the work bench 14.

The elongated water channel pipe 52 has a series of small holes 54 located along its length for dispersing high velocity jets of water into the interior of the fish scaling barrel 11 during rotation of said fish scaling barrel. Each of the end walls 20a, 20b of the fish scaling barrel 11 has an opening 55 to receive the elongated water channel pipe 52. A pair of sleeve bearings 56 slide over the ends of the elongated water channel pipe 52 and are secured thereto by pins 57. The sleeve bearings 56 are held on the water channel pipe 52 between the pins 57 and elements 48, 53a of mounting arrangement 25. Each bearing 56 includes a stop sleeve 61 securably mounted thereon. The stop sleeves 61 hold the fish scaling barrel therebetween in alignment on the elongated pipe 52.

The fish scaling barrel 11 is shown partially cut away to reveal the flipper protrusion member 63, which is an L-shaped piece that extends inwardly into the interior of the fish scaling barrel. Preferably, the flipper protrusion member 63 extends radially, or toward the barrel center. The flipper protrusion member 63 extends into the interior of the fish scaling barrel a sufficient distance to engage the fish and flip them as the barrel is rotated.

FIG. 6 is an exploded assembly view of the drive means 12. The drive wheel 27 is mounted onto a coupling shaft 65 and secured thereto by bolt 66. The coupling 65 is secured to a gear shaft 67 extending from the gear box 31. The gear shaft 67 is secured to the coupling shaft 65 by a bolt 68.

Figure 7:
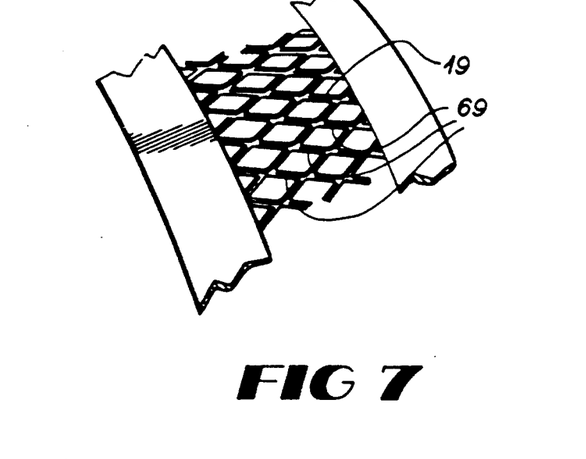
FIG. 7 is an enlarged partial view of the diamond shaped grate wall of the barrel of the fish scaler of FIG. 1.

FIG. 7 is an enlarged partial view of the fish scaling barrel 11 showing the diamond shaped grid design of the grate wall 19. The cross members 69 forming the grid design of the grate wall 19 have sharp leading edges on the interior sides thereof for contacting and scraping the sides of the fish as the fish tumble within the fish scaling barrel 11.

Figure 8A:
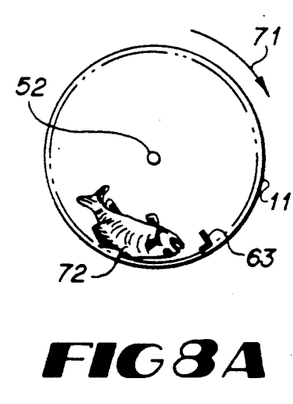
FIGS. 8A, 8B, and 8C are schematic views of the barrel of FIG. 1 showing the flipper protrusion member engaging a fish and causing it to tumble as the barrel is rotated.
Figure 8B:
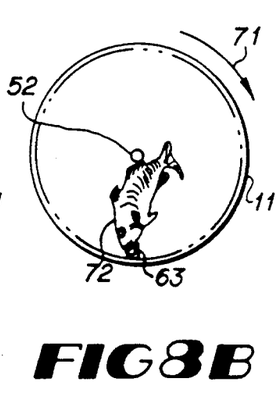
Figure 8C:
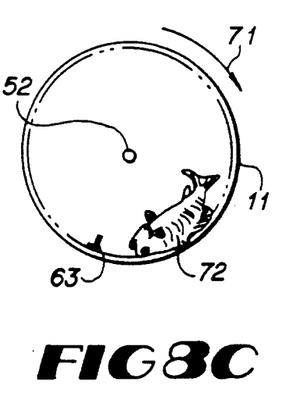

FIGS. 8A, 8B, and 8C show diagrammatically the fish scaling barrel 11 rotating in a direction depicted by arrows 71 about the elongated water channel pipe 52. The flipper protrusion member 63 engages a fish 72 as the fish scaling barrel rotates, causing the fish to tumble within the barrel. The foregoing tumbling action causes all sides of the fish to scrape against the mesh wall 19, thus insuring that the entire fish is scaled.

Figure 9:
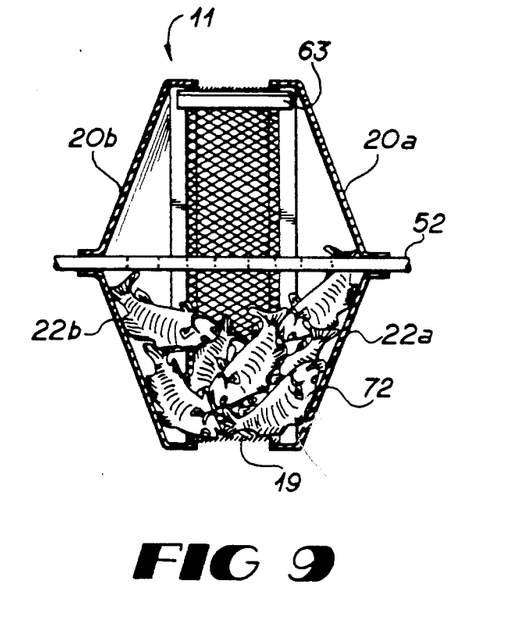
FIG. 9 is a side elevational cutaway view taken along the lines 9—9 of FIG. 3 shown with the barrel end walls in cross-section.

FIG. 9 is a elevational side cutaway view of the barrel 11 of the fish scaler 10 showing several fish 72 piled into the barrel. The two end wall pieces 20a, 20b are conically shaped to give the barrel a greater width at its center than at its perimeter along the cylindrical grate wall. This shape provides the barrel with a volume sufficient to load a large quantity of fish yet having a narrow profile along its scaling surface. Shown in FIG. 9 is a barrel that is less than one half loaded with fish. The angled side walls 22a, 22b of the end pieces 20a, 20b concentrate the fish 72 toward the center of the barrel and along the grate wall 19. So arranged, the fish 72 tend to pile up upon each other, thereby weighting down the fish 72 adjacent the grate wall 19. This increases the scaling force of the grate wall 19 against the fish, resulting in a more thoroughly scaled fish.

Figure 10:
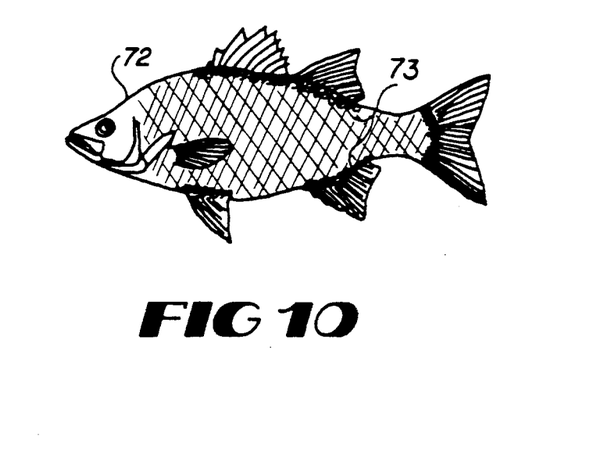
FIG. 10 is a side view of a fish that has been scaled in accordance with the present invention.

FIG. 10 is a side view of a fish 72 that has been sufficiently scaled. It should be noted that not all of the scales of the fish 72 are removed by the present invention. A few scales 73 remain on the fish 72 adjacent the dorsal, fins, and tail. These remaining scales need to be removed manually. However, such removal is easily accomplished when the dorsal, fins, and tail are removed.

Accordingly, it can be seen that an apparatus for scaling fish is now provided that is simple in design, yet which efficiently operates to scale sufficiently the fish by concentrating the fish together and flipping the fish as the fish are tumbled within a rotating barrel.

The features and principles of the present invention have been illustrated in the foregoing description of a preferred embodiment thereof. It will be apparent to those skilled in the art that numerous changes or modifications may be made thereto without departure from the spirit and scope of the invention. All such changes and modifications are intended to be within the scope of the present invention as set forth in the following claims.

Wherefore, the following is claimed:

1. A fish scaler for efficiently scaling fish, comprising:
a barrel for housing fish, said barrel having a cylindrical side wall provided with scraping edges on its interior surface, said scraping edges adapted to scrape sides of said fish during rotation of said barrel; said barrel also having opposed end walls, at least one of said walls being inclined for directing said fish towards the central portion of said barrel; rotation means for rotating said barrel; and
a flipper member, said flipper member adapted to progressively engage and flip fish during rotation of said barrel for tumbling said fish within said barrel.

2. The fish scaler of claim 1, wherein said barrel comprises a grate having cross members with sharp leading edges for scraping said fish.

3. The fish scaler of claim 1, wherein said side wall comprises a grate and said end walls including two opposed conically shaped walls for enclosing said cylindrical grate, said end walls tapering toward each other as they approach said grate for directing said fish toward said grate.

4. The fish scaler of claim 3, wherein said barrel comprises a greater diameter than width.

5. The fish scaler of claim 3, wherein said barrel comprises a diameter at least about twice as large as a width of said barrel.

6. The fish scaler of claim 1, wherein said flipper member is angled radially toward the center of said barrel.

7. The fish scaler of claim 1, wherein said end walls comprise two walls angled outwardly from the center of said barrel along the axis of rotation of said barrel.

8. The fish scaler of claim 3, wherein said rotation means comprises a drive wheel in abutment with the exterior of said grate and a drive means coupled to said drive wheel for rotating said drive wheel.

9. The fish scaler of claim 1, further comprising a rinse system having an elongated water channel pipe axially disposed within said barrel, said water channel pipe having holes for dispensing inwardly high velocity jets of water and a coupling outside of said barrel adapted to engage a water hose.

10. The fish scaler of claim 8, further comprising a biasing means for biasing said drive wheel against said barrel and wherein said drive wheel has a tread-like peripheral surface engaging said cylindrical grate.

11. A fish scaler for efficiently scaling fish, comprising:
   a barrel for containing fish to be scaled, said barrel including a cylindrical grate and two end walls for enclosing said cylindrical grate to form a fish scaling chamber, said cylindrical grate including cross members with sharp edges for scraping the sides of the fish within the fish scaling chamber, at least one of said side walls being inclined for directing said fish towards said cylindrical grate,
   rotation means for rotating said barrel about a horizontal axis, and
   a single flipper protrusion extending axially across said grate and protruding inwardly from said cylindrical grate into the fish scaling chamber to engage the fish as said barrel rotates and flip the fish so that the sharp edges of the cross members scrape all sides of the fish,
   whereby, upon placing a quantity of fish into the fish scaling chamber of said barrel and rotating said barrel, the fish tumble within the fish scaling chamber and are scaled by the sharp edges of said cylindrical grate.

12. The fish scaler of claim 11, wherein said barrel has greater diameter than width, thereby giving said barrel a narrow profile in order to concentrate the fish at the center of said barrel as said barrel is rotated.

13. The fish scaler of claim 11, wherein said barrel has a diameter at least twice as great as the corresponding width.

14. The fish scaler of claim 11, wherein interior surfaces of said end walls are angled outwardly from said cylindrical grate so that the fish scaling chamber has a greater width at the chamber center than at the chamber perimeter.

15. The fish scaler of claim 14, wherein said two end walls are conically shaped and opposed to each other.

16. The fish scaler of claim 11, wherein said rotation means comprises a drive wheel in abutment with the exterior side of said cylindrical grate and drive means coupled to said drive wheel for rotating said drive wheel, whereby said barrel is rotated upon activation of said drive means.

17. The fish scaler of claim 15, wherein said rotation means includes biasing means for biasing said drive wheel against said cylindrical grate wall and wherein said drive wheel has a tread-like surface engaging said grate.

18. The fish scaler of claim 11, further comprising a rinse system having an elongated water channel pipe axially disposed within said barrel, said water channel pipe having holes for dispensing inwardly high velocity jets of water and a coupling outside of said barrel adapted to engage a water hose.

19. A method for efficiently scaling fish, comprising the steps of:
   housing said fish in a barrel having scraping edges disposed on a cylinder, forming the central portion of said barrel, said scraping edges being adapted to scrape sides of said fish during rotation of said barrel;
   rotating said barrel;
   directing said fish along inclined surfaces toward the central portion of said barrel; and
   flipping said fish during rotation by causing said fish to tumble over a flipper member protruding inwardly from said barrel interior surface.

20. The method of claim 19, further comprising the step of rotating said fish in a substantially vertical plane in said barrel having a greater diameter than width.

21. A fish scaler comprising:
   a horizontally disposed, continuous cylindrical grate having a horizontal axis, opposed ends, and crisscrossed elements forming open diamond shapes, said elements having sharp leading edges;
   a pair of spaced opposed conically shaped end walls concentrically disposed with respect to said grate, said end walls tapering toward each other and toward the ends of said grate for supporting said grate therebetween and defining a barrel and for directing fish in said barrel toward said grate along an incline formed by the inner surfaces of said end walls;
   said barrel being rotatable about said axis of said grate;
   means for rotating said barrel;
   one of said end walls having an access opening therein; and
   an access door in said one of said end walls for closing said access opening.

22. The fish scaler defined in claim 21 wherein said means for rotating said barrel includes a drive wheel having a tread-like surface which engages said grate.

23. The fish scaler defined in claim 21 including a fish flipping member protruding from the inner surface of said grate inwardly for engaging and tumbling said fish when said flipping member is moved by movement of said member in an upward arcuate path and engages said fish for tumbling them, thereby exposing both sides of a fish to be engaged by said grate as said barrel is rotated.

24. The fish scaler defined in claim 21 wherein the diameter of said barrel is greater than its width.

* * * * *